Aug. 30, 1960    S. FARIA ET AL    2,951,169
ELECTROLUMINESCENT LAMP
Filed June 8, 1959
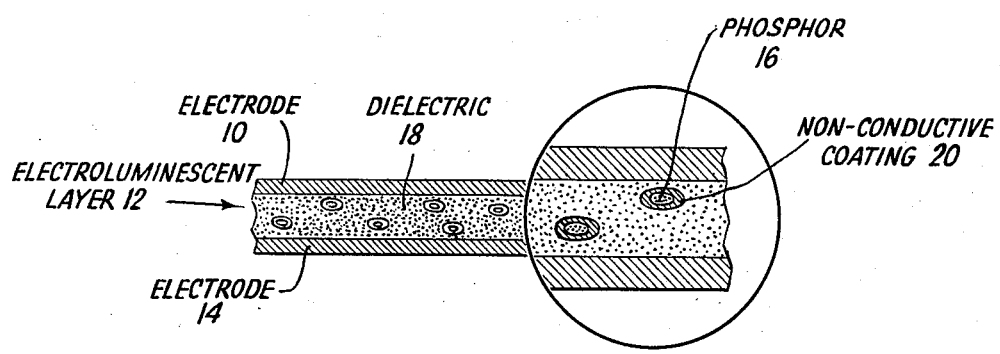
INVENTORS
SIXDENIEL FARIA
PAUL GOLDBERG
BY
ATTORNEY United States Patent Office
2,951,169
Patented Aug. 30, 1960

2,951,169

ELECTROLUMINESCENT LAMP

Sixdeniel Faria, Long Island City, and Paul Goldberg, Long Beach, N.Y., assignors to Sylvania Electric Products Inc., a corporation of Delaware Filed June 8, 1959, Ser. No. 818,789

2 Claims. (Cl. 313—108)

Our invention relates to electroluminescent lamps.

An electroluminescent lamp normally comprises an electroluminescent layer consisting of electroluminescent phosphor particles dispersed in a solid dielectric, and first and second electrodes secured to opposite surfaces of the electroluminescent layer. At least one of these electrodes permits the passage of light therethrough. When a variable voltage, as for example an alternating voltage, is applied between the electrodes, light is emitted from the layer.

For a given frequency of excitation, it has been found that the efficiency of the lamp first increases to a maximum value as the electric field strength increases, then decreases sharply as the field strength is further increased. The maximum efficiency occurs at relatively low field strength. On the other hand, the light output or brightness of the lamp increases monotonically with increasing electric field. Thus, above a certain brightness level, the lamp brightness can only be increased by sharply reducing the efficiency.

We have invented a new electroluminescent lamp wherein the efficiency decreases at a much lower rate with increasing electric field strength. As a result, in our lamp, a hight brightness level can be obtained at a relatively high efficiency, a result heretofore unobtainable.

In accordance with the principles of our invention, the electroluminescent layer of our lamp comprises electroluminescent phosphor particles, each of which is coated with electrically non-conductive material, the coated particles being dispersed in a solid dielectric.

We have found that lamps in accordance with our invention can have an efficiency of about 3.4 lumens per watt at a field strength of 100 volts per mil. as compared to an efficiency of about 1.5 lumens per watt obtainable with conventional lamps at the same field strength.

An illustrative embodiment of our invention will now be described with reference to the accompanying figure.

Referring now to the figure, there is shown an electroluminescent lamp comprising a first transparent electrode 10, an electroluminescent layer 12 and a second electrode 14. The electroluminescent layer consists of electroluminescent phosphor particles 16 (copper activated zinc sulfide) dispersed in a solid dielectric 18, each phosphor particle being coated with colloidal silica.

A lamp as shown in the figure was constructed, the electroluminescent layer containing 2 parts by weight of phosphor to 1 part by weight of dielectric, the phosphor particles being coated with about 1% by weight of colloidal silica. A 400 cycles per second alternating voltage was applied between the electrodes. At a field strength of 33.3 volts per mil, the lamp efficiency was found to be 6.7 lumens per watt at a light output of 4.4 foot lamberts. When the field strength was increased to 100 volts per mil, the efficiency dropped to 3.4 lumens per watt while the light output increased to 49 foot lamberts.

A second lamp containing uncoated electroluminescent phosphor particles but otherwise identical to the lamp of the figure was constructed and tested in the manner indicated above. At a field strength of 33.3 volts per mil., the efficiency was found to be 7.0 lumens per watt at a light output of 5.0 foot lamberts. However, when the field strength was increased to 100 volts per mil, the efficiency dropped to 1.5 lumens per watt while the light output increased to 57 foot lamberts.

Silica is not the only material which can be used. Any electrically non-conductive material which is transparent to visible light and is chemically inert to both phosphor and dielectric can be used. For example, potassium silicate or finely divided zinc sulfide can also be used.

What is claimed is:

1. An electroluminescent device comprising first and second spaced apart electrodes, at least one of which permits the passage of light therethrough, and an electroluminescent layer positioned between and in contact with both electrodes, said layer consisting of electroluminescent phosphor particles coated with colloidal transparent silica and dispersed in a solid dielectric, there being about two parts by weight of phosphor to about one part by weight of dielectric, the silica coating having a weight equal to about 1% of the weight of phosphor, and means to apply an alternating voltage between said electrodes, the efficiency of the device, at relatively high electric fields, decreasing relatively slowly with increasing field strength.

2. An electroluminescent lamp comprising first and second spaced apart electrodes, at least one of which permits the passage of light therethrough, and an electroluminescent layer positioned between and in contact with both electrodes, said layer consisting of electroluminescent phosphor particles coated with colloidal transparent silica and dispersed in a solid dielectric, there being about two parts by weight of phosphor to about one part by weight of dielectric, the silica coating having a weight equal to about 1% of the weight of phosphor, and means coupled to said electrodes to establish an alternating electric field within said layer, said field strength falling within the range 33.3–100 volts per mil of layer of thickness, the lamp efficiency decreasing from 6.7 to 3.4 lumens per watt as said field strength increases from its low value to its high value within said range.

References Cited in the file of this patent

UNITED STATES PATENTS

| | | |
|---|---|---|
| 2,824,992 | Bouchard | Feb. 25, 1958 |
| 2,857,541 | Etzel | Oct. 21, 1958 |

OTHER REFERENCES

Destriau: New Phenomenon of Electrophotoluminescence, Philosophical Mag., vol. 38, 1947, pages 700 to 713, 723.